United States Patent
Masubuchi et al.

(10) Patent No.: US 6,863,103 B1
(45) Date of Patent: Mar. 8, 2005

(54) STEEL CORD FOR THE REINFORCEMENT OF A RUBBER ARTICLE AND TIRE

(75) Inventors: Hideki Masubuchi, Tochigi Pref. (JP); Yukimasa Fukuda, Tochigi Pref. (JP)

(73) Assignee: Bridgestone Corporation, Tokyo (JP)

( * ) Notice: Subject to any disclaimer, the term of this patent is extended or adjusted under 35 U.S.C. 154(b) by 33 days.

(21) Appl. No.: 09/869,967

(22) PCT Filed: Nov. 10, 2000

(86) PCT No.: PCT/JP00/07944

§ 371 (c)(1),
(2), (4) Date: Jul. 10, 2001

(87) PCT Pub. No.: WO01/34900

PCT Pub. Date: May 17, 2001

(30) Foreign Application Priority Data

Nov. 11, 1999 (JP) .............................. 11-321046
Dec. 27, 1999 (JP) ............................. 11-369925

(51) Int. Cl.⁷ .............................. B60C 9/00; D02G 3/48; D07B 1/06
(52) U.S. Cl. ........................... 152/451; 57/211; 57/214; 57/236; 57/237; 57/902
(58) Field of Search .................................. 428/357, 364, 428/379; 57/210–214, 218, 902, 200, 217, 230, 231, 236; 152/451, 527, 556

(56) References Cited

U.S. PATENT DOCUMENTS

| | | | |
|---|---|---|---|
| 4,609,024 A | | 9/1986 | Yatsunami et al. ......... 152/527 |
| 4,763,466 A | * | 8/1988 | Abe et al. ...................... 57/213 |
| 5,461,850 A | * | 10/1995 | Bruyneel et al. ............. 57/212 |
| 5,473,878 A | | 12/1995 | Hamiel et al. ................ 57/213 |

FOREIGN PATENT DOCUMENTS

| | | | |
|---|---|---|---|
| EP | 0342492 | * | 11/1989 |
| JP | 62021888 | * | 1/1987 |
| JP | 62057994 | * | 3/1987 |
| JP | 5-186975 | | 7/1993 |
| JP | 05338753 | * | 12/1993 |
| JP | 6-173179 | * | 6/1994 |
| JP | 07238480 | * | 9/1995 |
| JP | 8-27686 | | 1/1996 |
| JP | 08081889 | * | 3/1996 |
| JP | 8-109585 | * | 4/1996 |
| JP | 08170283 | * | 7/1996 |
| JP | 8-170283 | * | 7/1996 |
| JP | 8-209567 | | 8/1996 |
| JP | 9-137392 | | 5/1997 |
| JP | 10-298879 | | 11/1998 |
| JP | 11-21775 | * | 1/1999 |

* cited by examiner

Primary Examiner—Blaine Copenheaver
Assistant Examiner—Justin Fischer
(74) Attorney, Agent, or Firm—Sughrue Mion, PLLC

(57) ABSTRACT

A steel cord having a strand construction formed by twisting a plurality of sheath strands each formed by twisting plural filaments around a core strand formed by twisting plural filaments is provided. At least one of the core strand and the sheath strands has a construction of twisting one or more sheath layers each made of plural filaments around a core made of one or plural filaments, and a diameter of a filament constituting an outermost sheath layer is made larger than that of a filament constituting at least one layer located inside thereof, whereby precedent breakage in a part of the filaments is avoided to improve the durability of the steel cord.

30 Claims, 8 Drawing Sheets

STEEL CORD FOR THE REINFORCEMENT OF A RUBBER ARTICLE AND TIRE

TECHNICAL FIELD

This invention relates to steel cords used as a reinforcing member for rubber articles such as a tire, an industrial belt and the like, and particularly intends to improve a durability of the rubber article.

BACKGROUND ART

A pneumatic tire as a typical example of the rubber articles, particularly a tire for construction vehicles is mounted onto a large-size dump truck or the like used in, for example, a large-scale civil engineering work site or an ore mining site, and subjected to severe operating conditions on rough road surfaces under a heavy load. This type of the tire is general to have a reinforcing structure that a carcass toroidally extending between a pair of bead cores is a skeleton and also a plurality of belt layers are arranged at an outside of the carcass in a radial direction.

As the above tire for the construction vehicle is particularly run on an irregular land having a violent unevenness under a heavy load, a tread of the tire is subject to a large deformation and hence a large compression force is repeatedly applied thereto. To this end, steel cords are used as a reinforcing member for the belt or the carcass in this type of the tire, wherein a strand construction such as 7×(3+9+15) construction or the like formed by twisting a plurality of strands, each being formed by twisting a plurality of filaments, is adopted for making a breaking load per a diameter of a cord large and providing a good resistance to fatigue.

As shown in FIG. 1, the cord having the 7×(3+9+15) construction comprises a core strand 10a formed by arranging two sheath layers 10b, 10c each made of plural filaments having the same diameter as in a core 10a around the core 10a made of three filaments, and six sheath strands 11 each having the same construction as mentioned above and twisted around the core strand. Moreover, numeral 12 is a wrapping filament.

On the other hand, in case of a cord having a single twisting construction or a layer construction formed by twisting a plurality of filaments, a sum of tenacities of the filaments as a constitutional element does not coincide with a tenacity of the cord but slightly decreases for each of the filaments inclined with respect to an axis of the cord (at a twisting angle) through the twisting.

This is true in the cord having the above strand construction. In case of the cord having the strand construction, particularly the cord of the strand construction made of high-tenacity filaments, there becomes a problem that the cord tenacity is decreased to an extent that can not be explained by the decrease resulted from the twisting angle as compared with the sum of the filament tenacities. That is, even when the cord of the strand construction is made of high-tenacity filaments, the improvement of the desired cord tenacity can not be attained.

In the cord of the strand construction to be targeted in the invention, as the core strand extends substantially straight in a central portion of the cord and is subjected to constriction from all sheath strands located around the core strand, stress concentration resulted from the constriction in the cord is apt to be caused in a portion contacting these strands with each other. Moreover, the conventional cord of the strand construction is a construction made of the filaments having a single diameter as shown in FIG. 1.

When such a cord of the strand construction is constituted with high-tenacity filaments, if tension is applied to the cord, it has been confirmed that the stress concentration resulted from the constriction of the core strand with each of the sheath strands becomes larger and a part of the filaments is broken prior to the cord breakage. In other words, when tension is applied to the cord, an outer-most sheath filament located in a contact portion between the strands is exposed to a state of being subjected to a compression load in a direction crossing with an axis of the filament while applying a tensile load. As a result, the breakage of the filament is caused due to shearing stress generated in the inside of the filament. In the cord of the strand construction, therefore, the breakage of the filament is particularly apt to be prematurely caused in outermost sheaths of the core strand and the sheath strand and a part of the filaments is precedently broken and hence the actual cord tenacity is decreased to an extent that can not be explained by the decrease resulted from the twisting angle as compared with the sum of tenacities of the filaments constituting the cord. This phenomenon is especially remarkable when a high tenacity material is used in the filament.

DISCLOSURE OF THE INVENTION

It is therefore, an object of the invention to provide a steel cord capable of developing a satisfactory durability by avoiding the precedent breakage in a part of filaments in the cord of the strand construction to suppress the lowering of the cord tenacity, and a tire having an excellent durability by using such a cord.

The inventors have made various studies with respect to means for solving the above problem, and found that when tension is applied to the cord, it is effective to mitigate an influence of compression load in the direction crossing with the axis of the filament added to the filaments in the outermost sheath located in the contact portion between the strands and to increase a diameter of the filament in the outermost sheath, and as a result the invention has been accomplished.

That is, the gist and construction of the invention are shown in the following items 1–19.

1. A steel cord for the reinforcement of a rubber article comprising a core strand formed by twisting a plurality of filaments and a plurality of sheath strands arranged around the core strand and each formed by twisting a plurality of filaments, characterized in that at least one of the core strand and the sheath strands is formed by twisting one or more sheath layers made of plural filaments around a core made of one or more filaments, and each of the filaments constituting an outermost sheath layer has a diameter larger than that of the filaments constituting at least any layer located inside the outermost sheath layer.

2. A steel cord for the reinforcement of a rubber article comprising a core strand formed by twisting a plurality of filaments and a plurality of sheath strands arranged around the core strand and each formed by twisting a plurality of filaments, characterized in that the core strand is formed by twisting one or two sheath layer made of plural filaments around a core made of three filaments, and filaments constituting each sheath layer have a diameter larger than that of filaments constituting a layer located inside of the sheath layer.

3. A steel cord for the reinforcement of a rubber article according to the item 2, wherein the sheath layer of the core strand is one and a ratio of total sectional area of all filaments constituting the core strand to area of a circumcircle formed by filaments constituting the sheath layer is not less than 0.715.

4. A steel cord for the reinforcement of a rubber article according to the item 2, wherein the core strand has two sheath layers and a ratio of total sectional area of all filaments constituting the core strand to area of a circumcircle formed by filaments constituting an outermost sheath layer is not less than 0.730.

5. A steel cord for the reinforcement of a rubber article comprising a core strand formed by twisting a plurality of filaments and a plurality of sheath strands arranged around the core strand and each formed by twisting a plurality of filaments, characterized in that each of the core strand and the sheath strand is formed by twisting one or two sheath layers made of plural filaments around a core made of three filaments, and the filaments constituting each sheath layer have a diameter larger than that of the filament constituting a layer located inside the sheath layer.

6. A steel cord for the reinforcement of a rubber article according to the item 5, wherein each strand has one sheath layer and a ratio of total sectional area of all filaments constituting the strand to area of a circumcircle formed by filaments constituting the sheath layer is not less than 0.715.

7. A steel cord for the reinforcement of a rubber article according to the item 5, wherein each strand has two sheath layers and a ratio of total sectional area of all filaments constituting the strand to area of a circumcircle formed by filaments constituting an outermost sheath layer is not less than 0.730.

8. A steel cord for the reinforcement of a rubber article according to the item 2 or 5, wherein a distance between mutual steel filaments in each layer of the strand is not more than 0.014 mm.

9. A steel cord for the reinforcement of a rubber article comprising a core strand formed by twisting a plurality of filaments and a plurality of sheath strands arranged around the core strand and each formed by twisting a plurality of filaments, characterized in that the sheath strand is formed by twisting two sheath layers each made of plural filaments around a core made of one or more filaments, and when a diameter of a filament constituting an outermost sheath layer in the sheath strand is $\phi s$ (mm) and a diameter of a circumcircle inscribing all filaments in the outermost sheath layer is $\Phi$ (mm), they satisfy a relation of $0.55 \leq \Phi/6.14\phi s \leq 0.90$, and when a diameter of a filament constituting an outermost sheath layer in the core strand is $\phi c$ (mm), it satisfies a relation of $\phi s \leq \phi c$.

10. A steel cord for the reinforcement of a rubber article according to the item 9, wherein all filaments other than filaments constituting the outermost sheath layer in the sheath strands has the same diameter.

11. A steel cord for the reinforcement of a rubber article according to the item 9, wherein all filaments other than filaments constituting the core in the sheath strands have the same diameter.

12. A steel cord for the reinforcement of a rubber article according to the item 9, wherein all filaments other than filaments constituting an outermost sheath layer in the core strand have the same diameter.

13. A steel cord for the reinforcement of a rubber article according to the item 9, wherein all diameter other than filaments constituting the core in the core stand have the same diameter.

14. A steel cord for the reinforcement of a rubber article according to the item 9, wherein all filaments constituting the core strand have the same diameter.

15. A steel cord for the reinforcement of a rubber article according to the item 9, wherein filaments constituting the outermost sheath layer in the sheath strand have a diameter of 0.20–0.50 mm.

16. A steel cord for the reinforcement of a rubber article according to the item 9, wherein the filaments have a tensile strength of not less than 3000 MPa.

17. A steel cord for the reinforcement of a rubber article according to the item 9, wherein the cord has a cord construction formed by arranging six sheath strands around one core strand, each of these strands has a construction formed by arranging two sheath layers made of plural filaments around a core made of three filaments.

18. A steel cord for the reinforcement of a rubber article according to the item 9, wherein a twisting direction of the outermost sheath layer in the sheath strand is the same as that of the sheath strand.

19. A steel cord for the reinforcement of a rubber article according to the item 9, wherein the cord has a wrapping filament helically wound along an outer periphery of the cord.

20. A tire comprising a carcass toroidally extending between a pair of bead portions as a skeleton and a belt disposed on an outside of the carcass in a radial direction and comprised of plural belt layers, characterized in that steel cords as claimed in the item 1 are applied to at least one of the carcass and the belt layers.

That is, the steel cord for the reinforcement of the rubber articles according to the invention is characterized in that in the cord of the strand construction such as the above 7×(3+9+15), 7×(3+8), 7×(3+9+12), 7×(3+8+13) or the like, the filaments constituting the outermost sheath layer in at least one of the core strand and the sheath strands have a diameter larger than that of the filaments constituting at least one layer located inside the outermost sheath layer.

As mentioned above, the reason why the actual cord tenacity in the cord of the strand construction is decreased to an extent that can not be explained by the decrease resulted from the twisting angle as compared with the sum of tenacities of the filaments constituting the cord is due to the fact that when a tension is applied to the cord, each sheath strand is constricted toward the core strand and hence the stress concentration occurs in the filaments of the outermost sheath layer in the strand. Therefore, the feature that the diameter of the filament in the outermost sheath layer subjected to the stress concentration is made larger than that of the filament constituting any layer located inside the outermost sheath layer is a very effective means for controlling the precedent breakage of the filaments in the outermost sheath layer.

Various cord constructions in which the diameter of the filament constituting the outermost sheath layer in the strand is made larger than that of the filament constituting at least one layer located inside the outermost sheath layer will individually be explained below.

Firstly, the case that the diameter of the filament constituting the outermost sheath layer of the core stand in the cord of the strand construction is made larger than that of the filament constituting at least one layer located inside of the outermost sheath layer will be described concretely with reference to FIGS. 2 and 3. That is, FIGS. 2 and 3 show cross sections of the steel cords according to the invention to be applied to a tire or the like with respect to twisting constructions of 7×(3+8) and 7×(3+8+13), respectively.

The steel cord shown in FIG. 2 is formed by twisting a plurality of sheath strands 2 made of plural filaments around a core strand 1 formed by twisting a sheath layer 1b made of eight filaments around a core 1a made of three filaments. In this embodiment, the construction of the sheath strand 2 is not especially limited and also a wrapping filament may helically be wound along an outer periphery of the cord.

The steel cord shown in FIG. 3 is formed by twisting a plurality of sheath strands 2 made of plural filaments around a core strand 1 formed by twisting a first sheath layer 1b made of eight filaments around a core 1a made of three filaments and then twisting a second sheath layer 1c made of thirteen filaments around the first sheath layer 1b. In this embodiment, the construction of the sheath strand 2 is not especially limited and also a wrapping filament may helically be wound along an outer periphery of the cord.

In the core strand 1, it is important that the diameter of the filament constituting the outermost sheath layer is larger than that of the filament constituting at least one layer located inside the outermost sheath layer. Particularly, the diameter of the filament constituting each sheath layer is preferable to be larger than that of the filament constituting the layer located inside of the respective sheath layer. That is, in the core strand having a two-layer construction as shown in FIG. 2, it is important that the diameter of the filament constituting the sheath layer 1b is larger than that of the filament constituting the core 1a located inside the sheath layer.

Similarly, in the core strand having a three-layer construction as shown in FIG. 3, it is important that the diameter of the filament constituting the second sheath layer 1c is larger than that of the filament constituting the first sheath layer 1b and/or the core 1a located inside the second sheath layer. Preferably, as shown in FIG. 3, it is advantageous that the diameter of the filament constituting the second sheath layer 1c is larger than that of the filament constituting the first sheath layer 1b located inside the second sheath layer and the diameter of the filament constituting the first sheath layer 1b is larger than that of the filament constituting the core 1a located inside the first sheath layer.

Because, in addition to the above effect of controlling the precedent breakage of the filaments in the outermost sheath layer, when the diameter of the filament in the outer layer is made larger than that of the filament in the inner layer in the core strand, the contact area of the filaments between the layers and further between the strands is increased as compared with the conventional case using the same diameter filaments, and hence when tension is applied to the cord, the filaments between the layers and further between the strands cooperatively bear the tension to control the precedent breakage due to the stress concentration.

Especially, when the diameter of the filament in the outer layer in the core strand is made larger than that of the filament in the inner layer, if the core strand has the two-layer construction as shown in FIG. 2, it is favorable that a ratio of total sectional area of all filaments constituting the core strand to formed by filaments constituting the sheath layer (hereinafter referred to as filament occupying ratio) is not less than 0.715. That is, when the filament occupying ratio is not less than 0.715, the gap between the filaments becomes small and it is a possible to disperse contact stress between the filaments even in each of the layers during the tension bearing and the control of the precedent breakage due to the stress concentration is more ensured.

Similarly, when the core strand has the three-layer construction as shown in FIG. 3, it is favorable that the filament occupying ratio based on a circumcircle formed by the filaments constituting the second sheath layer 1c is not less than 0.730.

Therefore, it is enough that the diameters of the filaments in the inner layer and the outer layer of the strand are set so as to satisfy the above filament occupying ratios.

Concretely, it is more effective that a distance between mutual steel filaments in each layer of the strand is made to not more than 0.014 mm for controlling the precedent breakage due to the stress concentration.

Although a construction that the diameter of the filament in the outer layer is made larger than that in the inner layer is applied only to the core strand in the cords shown in FIGS. 2 and 3, it is possible to apply the construction the diameter of the filament in the outer layer is made larger than that in the inner layer to not only the core strand 1 but also the sheath strands 2 arranged therearound as shown in FIGS. 4 and 5. That is, the diameter of the filament in the outer layer is made larger than that in the inner layer in all strands constituting the cord, whereby the above action and effects are allowed to all strands constituting the cord, so that the holding of cord tenacity can be more ensured.

In the cords shown in FIGS. 2–5 the construction of the stand to be applied in the invention is made 3+8 or 3+8+13 construction, but the invention can also be applied to a strand of 3+7 or 3+7+12. In the latter case, the number of the filaments in the outermost layer is not more than 8 when the strand has a two-layer construction and not more than 13 when the strand has a three-layer construction, which are preferable to control the precedent breakage.

Similarly, the cord construction is not limited to the illustrated embodiment wherein six sheath strands are twisted around the single core strand. For example, it is possible to take a construction that seven, eight or nine sheath strands are twisted around the single core strand by using the sheath strand having a diameter different from that of the core strand. Moreover, it is possible to wind a wrapping filament around the outer circumference of the cord.

As the filament constituting the cord, it is preferable to use a high tensile strength steel having a carbon content of 0.80–0.85% by weight for ensuring the strength of the rubber article.

The cord according to the invention is not limited to the above illustrated embodiments as previously mentioned. As another embodiment, the twisting constructions of 7×(3+9+12)+1 and 7×(3+9+13)+1 will be concretely explained below.

That is, FIGS. 6 and 7 show cross sections of steel cords according to the invention applied to the tire or the like with respect to twisting constructions of 7×(3+9+12)+1 and 7×(3+9+13)+1, respectively.

The steel cord shown in FIG. 6 is formed by twisting a first sheath layer 1b made of nine filaments around a core 1a made of three filaments and twisting a second sheath layer 1c made of twelve filaments around the first sheath layer 1b to form a core strand 1 and then twisting six sheath strands 2 each having the same construction as the core strand around the core strand 1. In the illustrated embodiment, a wrapping filament 3 is helically wound along the outer circumference of the cord, but such a wrapping filament 3 may be omitted.

And also, the steel cord shown in FIG. 7 is formed by twisting a first sheath layer 1b made of nine filaments around a core 1a made of three filaments and further twisting a second sheath layer 1c made of thirteen filaments around the first sheath layer 1b to form a core strand 1 and then twisting six strands 2 having the similar construction around the core strand. In the illustrated embodiment, a wrapping filament 3 is helically wound along the outer circumference of the cord, but such a wrapping filament 3 may be omitted.

In this case, it is important that in at least one of the core strand 1 and the sheath strands 2, the diameter of the filament constituting the outermost sheath layer is larger than that of the filament constituting at least one layer located inside of the outermost sheath layer. In the illustrated embodiments of FIGS. 6 and 7, the diameter of the filament constituting the outermost sheath layer is larger than that of the filament constituting the inner layer located inside the outermost sheath layer in the core strand 1 and the sheath strands 2.

In case that the diameter of the filament constituting the outermost sheath layer in at least one of core strand 1a nd the sheath strands 2 is made larger than that in the inner layer located inside the outermost sheath layer, it is favorable that when a diameter of a circumcircle of the sheath strand 2 is $\Phi$ (mm) and a diameter of a filament constituting the outermost sheath layer or the second sheath layer 1c is $\phi s$ (mm), they satisfy a relation of $0.55 \leq \Phi/6.14\phi s \leq 0.90$, and when a diameter of a filament constituting the outermost sheath layer in the core strand is $\phi c$ (mm), it satisfies a relation of $\phi s \leq \phi c$.

Because, by making large the diameter of the filament in the outermost layer causing the precedent breakage in the core strand and the sheath strands of the conventional cord, such a precedent breakage is avoided and hence the lowering of the cord tenacity is prevented.

That is, when $\Phi/6.14\phi s$ exceeds 0.90, it is difficult to obtain the above effect, while when it is less than 0.55, the fatigue resistance is badly affected. And also, as the filaments in the outermost layer of the core strand are subjected to a state of stress concentration equal to or severer than that in the filaments constituting the outermost layer of the sheath strand, it is preferable to make the diameter equal to or more than the diameter in the outermost layer of the sheath strand.

Moreover, in the illustrated embodiments of FIGS. 6 and 7, the diameter of the filament constituting the second sheath layer 1c is made larger than those of the filaments in the layer located inside thereof and the diameters of the filaments constituting the first sheath 1b and the core 1a are the same, but it is possible to make the diameter of the filament constituting the first sheath 1b larger-than that of the filament constituting the core 1a. In the latter case, the occurrence of the precedent breakage is controlled by making large the diameter of the filament constituting the outermost layer, but also the precedent breakage of the filaments in the layer located inside the outermost layer, which are thought to be large in the degree of stress concentration next to the outermost layer, is controlled, so that the effect of preventing the lowering of the cord tenacity is more expected.

In the cords shown in FIG. 6 or FIG. 7, the construction of the strand to be applied in the invention is a construction of 3+9+12 or 3+9+13. In addition, the invention can be applied to a strand having a construction of (3+9+15)+6×(3+9+12) shown in FIG. 8 or a construction of (3+9+15)+6×(3+9+13). In the latter case, the core strand has a construction having a diameter of a circumcircle larger than that in the sheath strand, so that there is an advantageous that the gap between the sheath strands can be ensured. Thus, the effect of promoting the penetration of rubber into the inside of the cord is obtained when the cord is embedded in the rubber article.

Similarly, the illustrated embodiment wherein six sheath strands are twisted around a single core strand is preferable as the construction of the cord, but it is possible to have a construction that seven, eight or nine sheath strands are twisted around the single core strand, for example, by using a sheath strand having a diameter different from that of the core strand. A typical embodiment having a construction of 1+8 is shown in FIG. 9. And also, it is possible to wind a wrapping filament around the outer circumference of the cord.

Moreover, the diameter of the filament constituting the outermost sheath layer in the sheath strand is advantageous to be 0.20–0.50 mm. Because, when the diameter of the filament is less than 0.20 mm, it is difficult to obtain the above effect by increasing the diameter of the filament, while when it exceeds 0.50 mm, the tensile strength of the filament becomes lower and hence it is difficult to obtain a high tensile strength cord.

In the cord according to the invention, it is significant to use a filament having a tensile strength of not less than 3000 MPa. Because, when using the filament having a tensile strength of not less than 3000 MPa, the lowering of the cord tenacity with respect to the total tenacity of the filaments as mentioned above becomes remarkable.

Furthermore, when the twisting direction of the outermost sheath layer in the sheath strand is the same as the twisting direction of the sheath strand with respect to the core strand, the filaments in the outermost layers between the adjacent strands can be rendered into a state more approaching to a line contact, which is advantageous to mitigate the local concentration of stress.

Moreover, the wrapping filament is effective to prevent the loosening of the strands from the cord and particularly contributes to improve the operability in a factory.

Incidentally, the above cords serve for the reinforcement of the tire by applying a ply containing many cords arranged side by side at given intervals and embedded in a rubber sheet to a belt or a carcass of the tire. As such a tire, a pneumatic tire for construction vehicle as shown for example, in FIG. 10 is advantageously suitable. This tire comprises a radial carcass 21 comprised of steel cord ply(s) toroidally extending between a pair of bead cores 20, a belt 22 disposed at an outside of a crown portion of the carcass 21 in the radial direction of the tire and comprised of at least four belt layers, usually six belt layers, and a tread 23 arranged at the outside of the belt 22 in the radial direction of the tire.

BRIEF DESCRIPTION OF THE DRAWINGS

FIG. 9 is a diagrammatically section view of an embodiment of the cord according to the invention having a twisting construction of (3+9+15)+8×(3+9+8)+1.

BEST MODE FOR CARRYING OUT THE INVENTION

EXAMPLE 1

With respect to steel cords having a construction as shown in Table 1, the filament occupying ratio and the ratio of developing the cord tenacity are investigated. Moreover, the filament occupying ratio is a ratio of total sectional area of all filaments constituting the strand to area of a circumcircle formed by filaments constituting the outermost sheath layer as previously mentioned, and the ratio of developing the cord tenacity is a ratio by percentage of load at break of the cord to sum of tensile strengths of straight filaments constituting the cord. The measured results are also shown in Table 1.

TABLE 1

Figure 1:
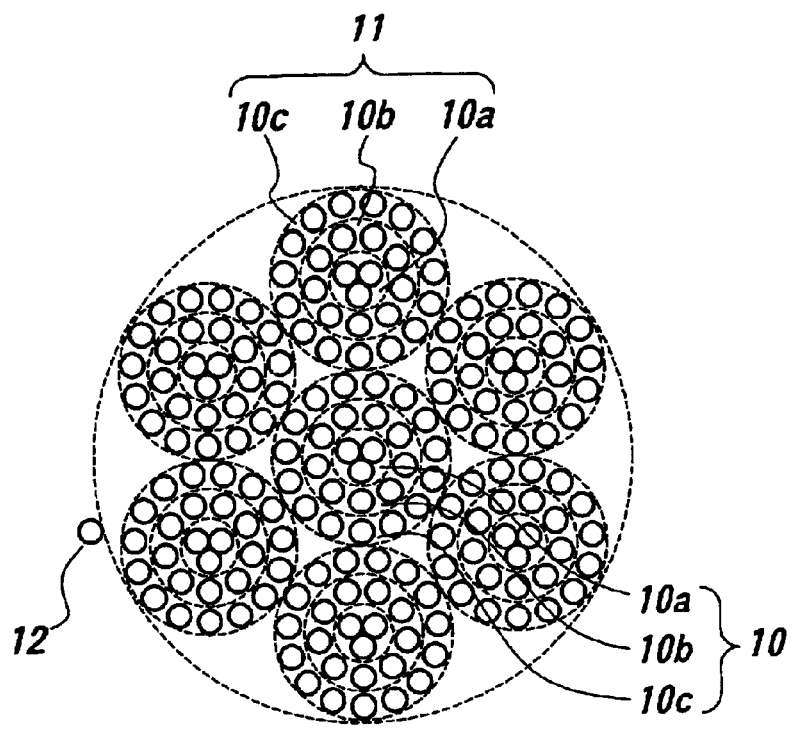
FIG. 1 is a diagrammatically section view of the conventional cord having a 7×(3+9+15)+1 construction.
Figure 2:
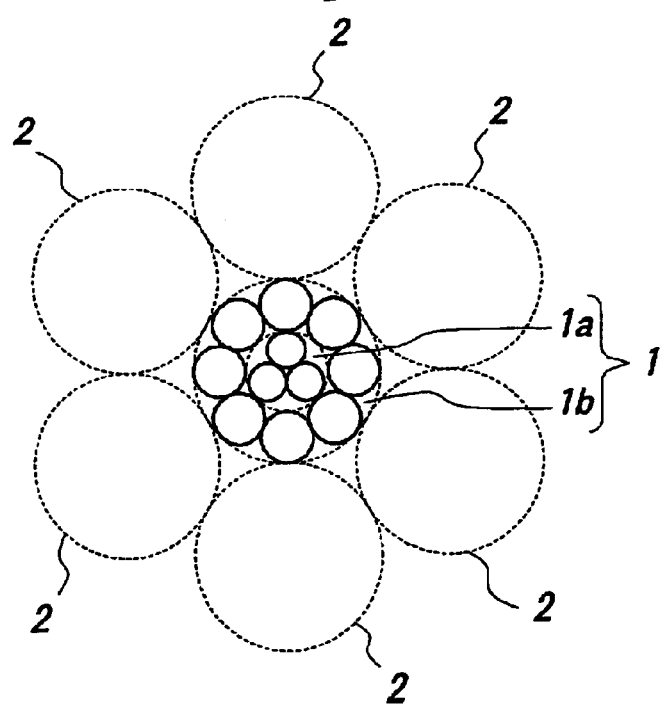
FIG. 2 is a diagrammatically section view of an embodiment of the cord according to the invention wherein a core strand has a 3+8 construction.
Figure 3:
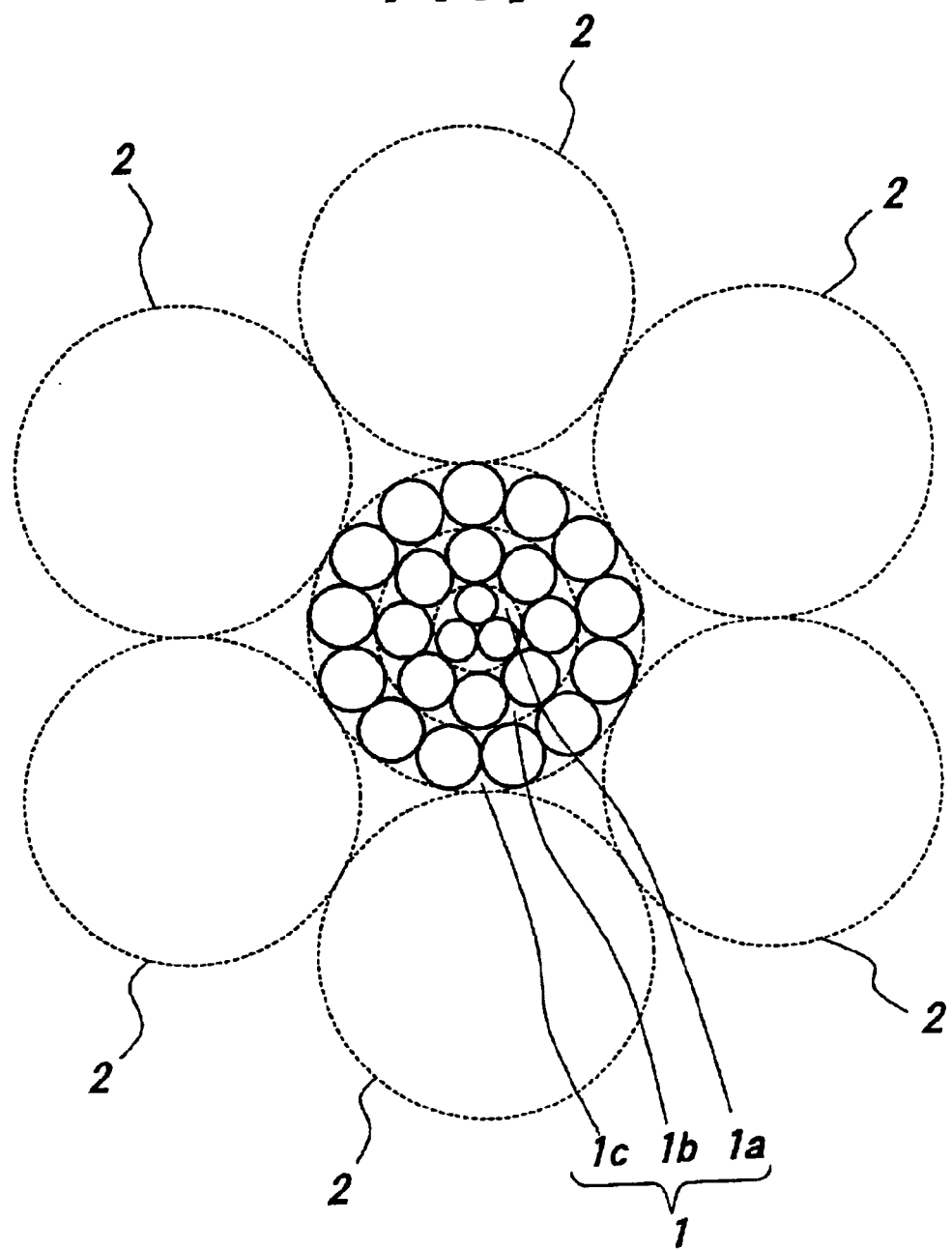
FIG. 3 is a diagrammatically section view of an embodiment of the cord according to the invention wherein a core strand has a 3+8+13 construction.
Figure 4:
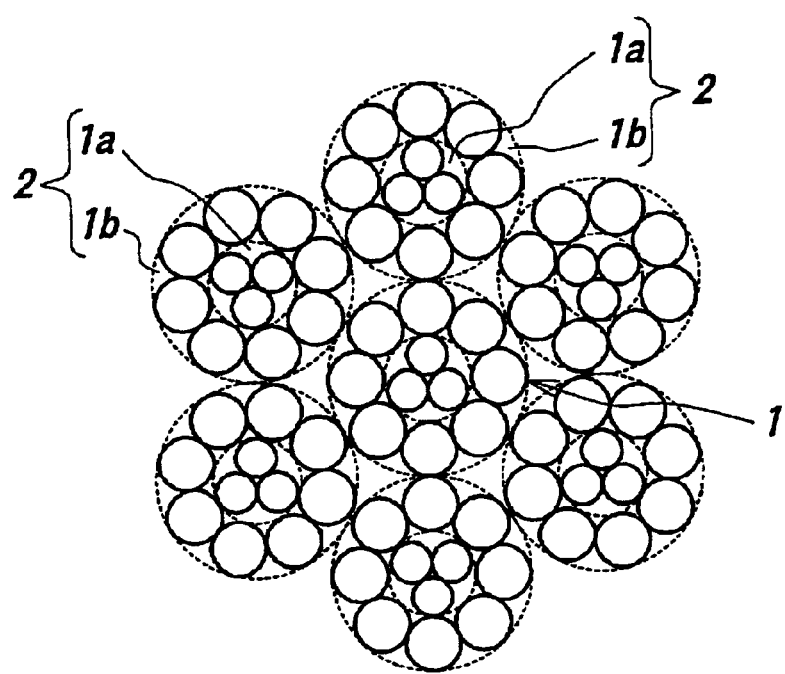
FIG. 4 is a diagrammatically section view of an embodiment of the cord according to the invention having a twisting construction of 7×(3+8)
Figure 5:
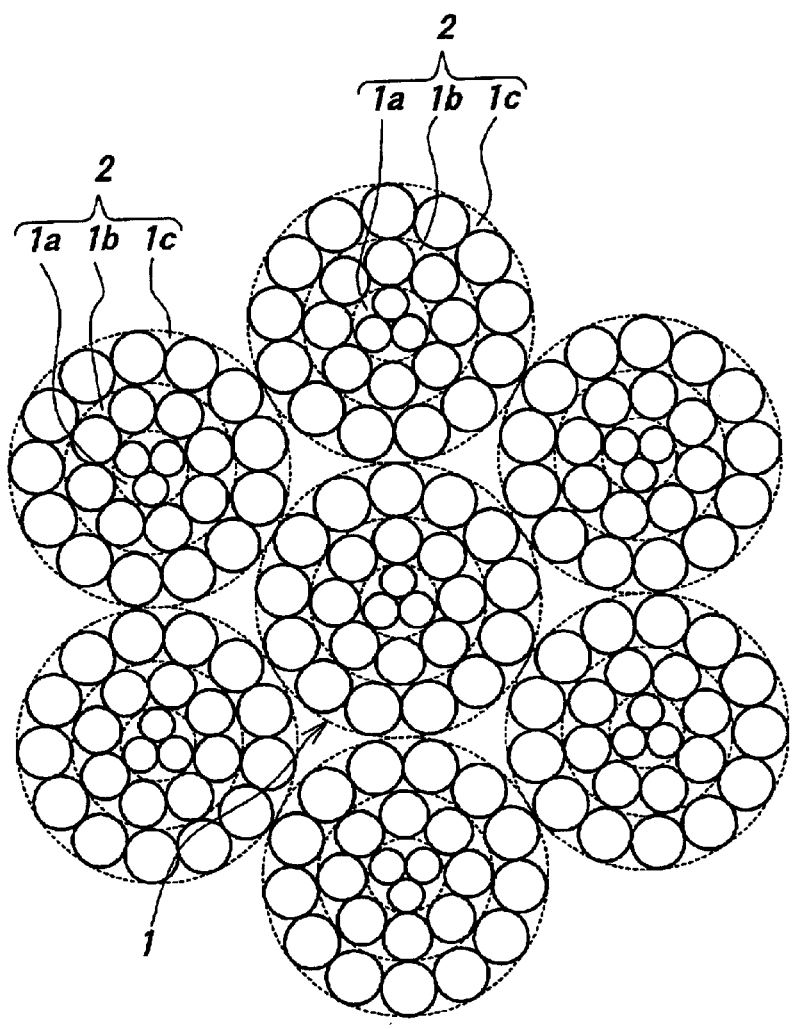
FIG. 5 is a diagrammatically section view of an embodiment of the cord according to the invention having a twisting construction of 7×(3+8+13)

| | | Conventional Example 1-1 | Conventional Example 1-2 | Comparative Example | Example 1-1 | Example 1-2 | Example 1-3 | Example 1-4 | Example 1-5 |
|---|---|---|---|---|---|---|---|---|---|
| Construction of cord | | 7 × 12 + 1 | 7 × 27 + 1 (FIG. 1) | 7 × 31 + 1 | 7 × 11 + 1 (FIG. 4) | 7 × 24 + 1 (FIG. 5) | 7 × 24 + 1 (FIG. 5) | 11 + 6 × 12 + 1 (FIG. 2) | 24 + 6 × 27 + 1 (FIG. 3) |
| Construction of core strand | | 3 + 9 | 3 + 9 + 15 | 3 + 10 + 18 | 3 + 8 | 3 + 8 + 13 | 3 + 8 + 13 | 3 + 8 | 3 + 8 + 13 |
| Construction of sheath strand | | 3 + 9 | 3 + 9 + 15 | 3 + 10 + 18 | 3 + 8 | 3 + 8 + 13 | 3 + 8 + 13 | 3 + 9 | 3 + 8 + 15 |
| Core strand | Filament diameter in core (mm) | 0.29 | 0.29 | 0.28 | 0.25 | 0.21 | 0.23 | 0.25 | 0.23 |
| | Filament diameter in sheath layer (first sheath layer) (mm) | 0.29 | 0.29 | 0.26 | 0.33 | 0.27 | 0.29 | 0.33 | 0.29 |
| | Filament diameter in second sheath layer (mm) | — | 0.29 | 0.23 | — | 0.30 | 0.33 | — | 0.33 |
| | Tensile strength of filament (MPa) core | 3374 | 3374 | 3386 | 3356 | 3606 | 3414 | 3356 | 3414 |
| | first sheath | 3374 | 3374 | 3399 | 3267 | 3319 | 3374 | 3267 | 3374 |
| | second sheath | — | 3374 | 3414 | — | 3303 | 3267 | — | 3267 |
| Sheath strand | Filament diameter in core (mm) | 0.29 | 0.29 | 0.28 | 0.25 | 0.21 | 0.23 | 0.29 | 0.28 |
| | Filament diameter in sheath layer (first sheath layer) (mm) | 0.29 | 0.29 | 0.26 | 0.33 | 0.27 | 0.29 | 0.29 | 0.28 |
| | Filament diameter in second sheath layer $\phi$s (mm) | — | 0.29 | 0.23 | — | 0.30 | 0.33 | — | 0.28 |
| | Tensile strength of filament (MPa) core | 3374 | 3374 | 3386 | 3356 | 3606 | 3414 | 3374 | 3386 |
| | first sheath | 3374 | 3374 | 3399 | 3267 | 3319 | 3374 | 3374 | 3386 |
| | second sheath | — | 3374 | 3414 | — | 3303 | 3267 | — | 3386 |
| Diameter of sheath strand $\Phi$ (mm) | | 1.206 | 1.786 | 1.584 | 1.199 | 1.593 | 1.736 | 1.206 | 1.724 |
| $\Phi/6.14\,\phi s$ | | — | 1.00 | 1.12 | — | 0.86 | 0.86 | — | 1.00 |
| Diameter of wrapping filament (mm) | | 0.25 | 0.25 | 0.25 | 0.25 | 0.25 | 0.25 | 0.25 | 0.25 |
| Diameter of cord (mm) | | 3.62 | 5.36 | 4.75 | 3.60 | 4.78 | 5.21 | 3.61 | 5.16 |
| Gap between filaments in outermost layer of core strand (mm) | | 0.023 | 0.021 | 0.005 | 0.002 | 0.009 | 0.011 | 0.002 | 0.001 |
| Gap between filaments in outermost layer of sheath strand (mm) | | 0.023 | 0.021 | 0.005 | 0.002 | 0.009 | 0.011 | 0.023 | 0.020 |
| Filament occupying ratio in core strand | | 0.695 | 0.713 | 0.743 | 0.737 | 0.744 | 0.746 | 0.737 | 0.760 |
| Filament occupying ratio in sheath strand | | 0.695 | 0.713 | 0.743 | 0.737 | 0.744 | 0.746 | 0.695 | 0.713 |
| Ratio of developing tenacity (%) | | 86 | 82 | 77 | 95 | 94 | 93 | 91 | 89 |

EXAMPLE 2

With respect the steel cords having a construction as shown in tables 2 and 3, the filament occupying ratio and the ratio of developing the cord tenacity are investigated. Moreover, the filament occupying ratio is a ratio of total sectional area of all filaments constituting the strand to area of a circumcircle formed by filaments constituting the outermost sheath layer as previously mentioned, and the ratio of developing the cord tenacity is a ratio by percentage of load at break of the cord to sum of tensile strengths of straight filaments constituting the cord. The measured results are also shown in Tables 2 and 3. Moreover, Tables 2 and 3 show a group of cords prepared under the same twisting angle in all cords every each Table.

TABLE 2

Figure 6:
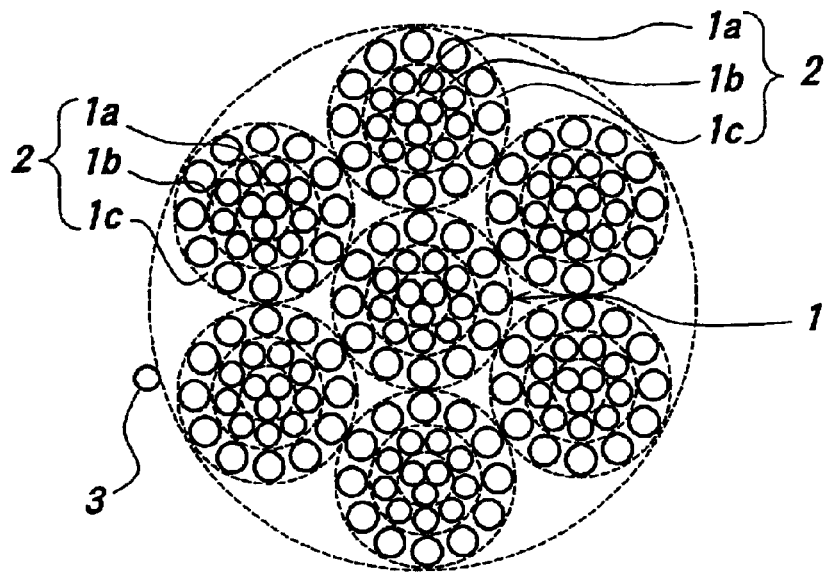
FIG. 6 is a diagrammatically section view of an embodiment of the cord according to the invention having a twisting construction of 7×(3+9+12)+1
Figure 8:
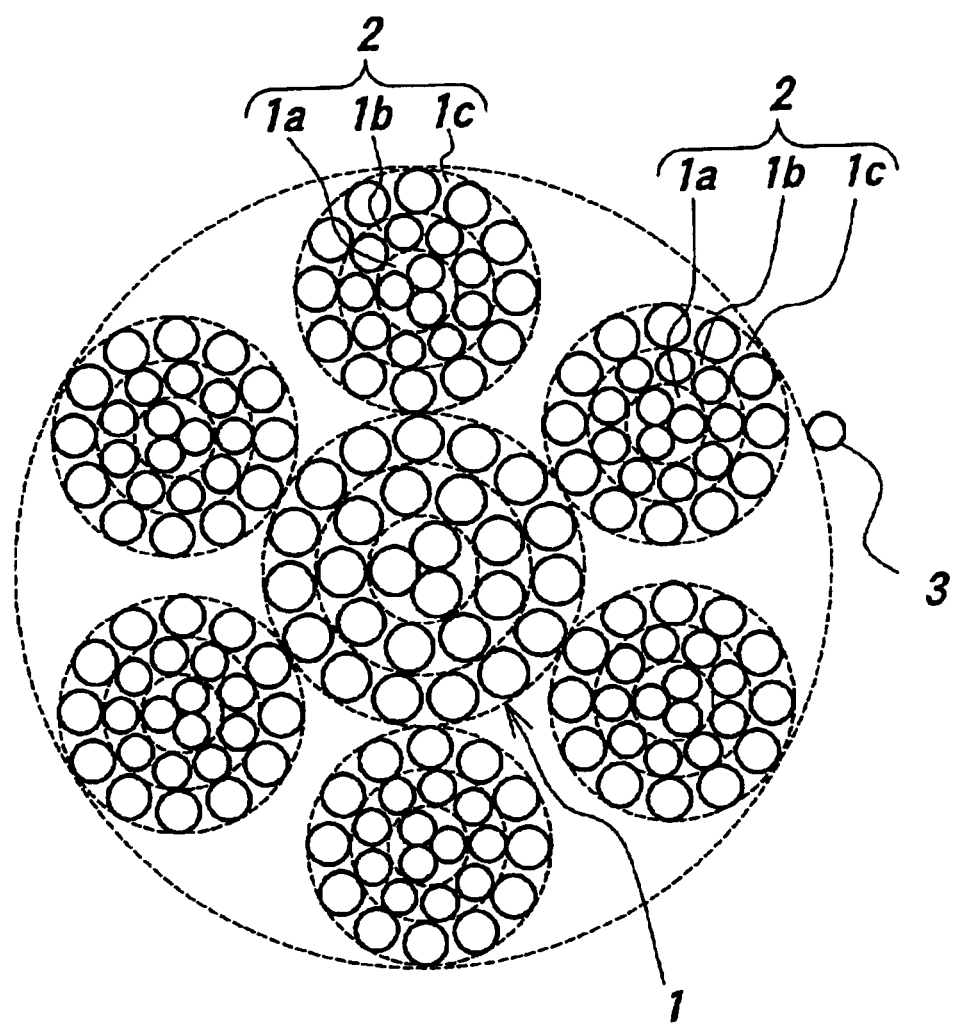
FIG. 8 is a diagrammatically section view of an embodiment of the cord according to the invention having a twisting construction of (3+9+15)+6×(3+9+12)+1.

| | | Conventional Example 21 | Conventional Example 22 | Example 21 | Example 22 |
|---|---|---|---|---|---|
| Construction of cord | | 7 × 27 + 1 (FIG. 1) | 7 × 27 + 1 (FIG. 1) | 7 × 24 + 1 (FIG. 6) | 27 + 6 × 24 + 1 (FIG. 8) |
| Construction of core strand | | 3 + 9 + 15 | 3 + 9 + 15 | 3 + 9 + 12 | 3 + 9 + 15 |
| Construction of sheath strand | | 3 + 9 + 15 | 3 + 9 + 15 | 3 + 9 + 12 | 3 + 9 + 12 |
| Core strand | Filament diameter in core (mm) | 0.24 | 0.24 | 0.215 | 0.27 |
| | Filament diameter in first sheath layer (mm) | 0.24 | 0.24 | 0.215 | 0.27 |
| | Filament diameter in second sheath layer $\phi c$ (mm) | 0.24 | 0.24 | 0.290 | 0.27 |
| | Tensile strength of filament (MPa) | | | | |
| | core | 2874 | 3468 | 3595 | 3385 |
| | first sheath | 2874 | 3468 | 3595 | 3385 |
| | second sheath | 2874 | 3468 | 3370 | 3385 |
| Sheath strand | Filament diameter in core (mm) | 0.24 | 0.24 | 0.215 | 0.20 |
| | Filament diameter in first sheath layer (mm) | 0.24 | 0.24 | 0.215 | 0.20 |
| | Filament diameter in second sheath layer $\phi s$ (mm) | 0.24 | 0.24 | 0.290 | 0.27 |
| | Tensile strength of filament (MPa) | | | | |
| | core | 2874 | 3468 | 3595 | 3612 |
| | first sheath | 2874 | 3468 | 3595 | 3612 |
| | second sheath | 2874 | 3468 | 3370 | 3385 |
| Diameter of sheath strand $\Phi$ (mm) | | 1.478 | 1.478 | 1.474 | 1.371 |
| $\Phi/6.14\ \phi s$ | | 1.00 | 1.00 | 0.83 | 0.83 |
| Diameter of wrapping filament (mm) | | 0.25 | 0.25 | 0.25 | 0.25 |
| Diameter of cord (mm) | | 4.43 | 4.43 | 4.42 | 4.40 |
| Gap between filaments in outer-most layer of core strand (mm) | | 0.017 | 0.017 | 0.016 | 0.019 |
| Gap between filaments in outer-most layer of sheath strand (mm) | | 0.017 | 0.017 | 0.016 | 0.015 |
| Filament occupying ratio in core strand | | 0.713 | 0.713 | 0.721 | 0.713 |
| Filament occupying ratio in sheath strand | | 0.713 | 0.713 | 0.721 | 0.721 |
| Ratio of developing tenacity (%) | | 91.8 | 83.7 | 91.4 | 90.9 |

TABLE 3

Figure 7:
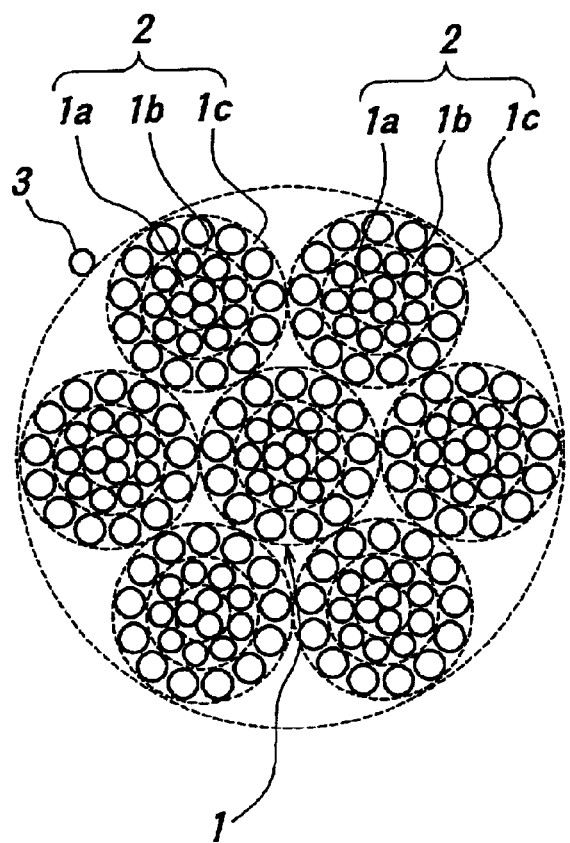
FIG. 7 is a diagrammatically section view of an embodiment of the cord according to the invention having a twisting construction of 7×(3+9+13)+1.
Figure 9:
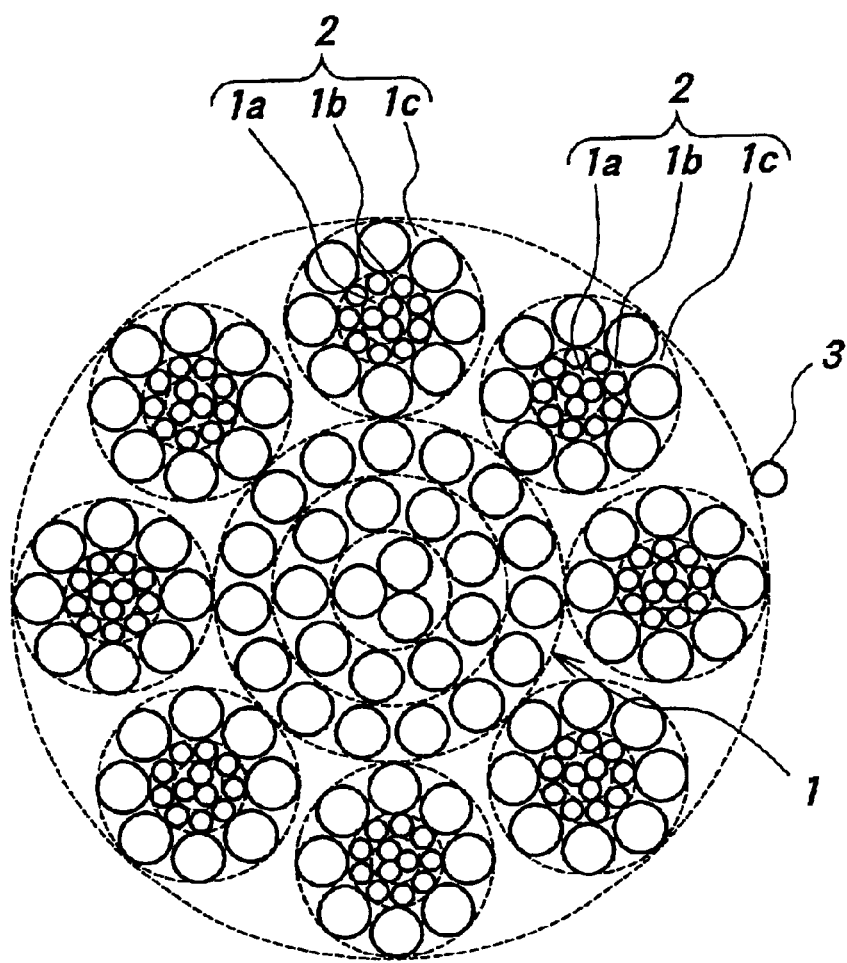
FIG. 9 is a diagrammatically section view of an embodiment of the cord according to the invention having a twisting construction of (3+9+15)+6×(3+9+12)+1.
Figure 10:
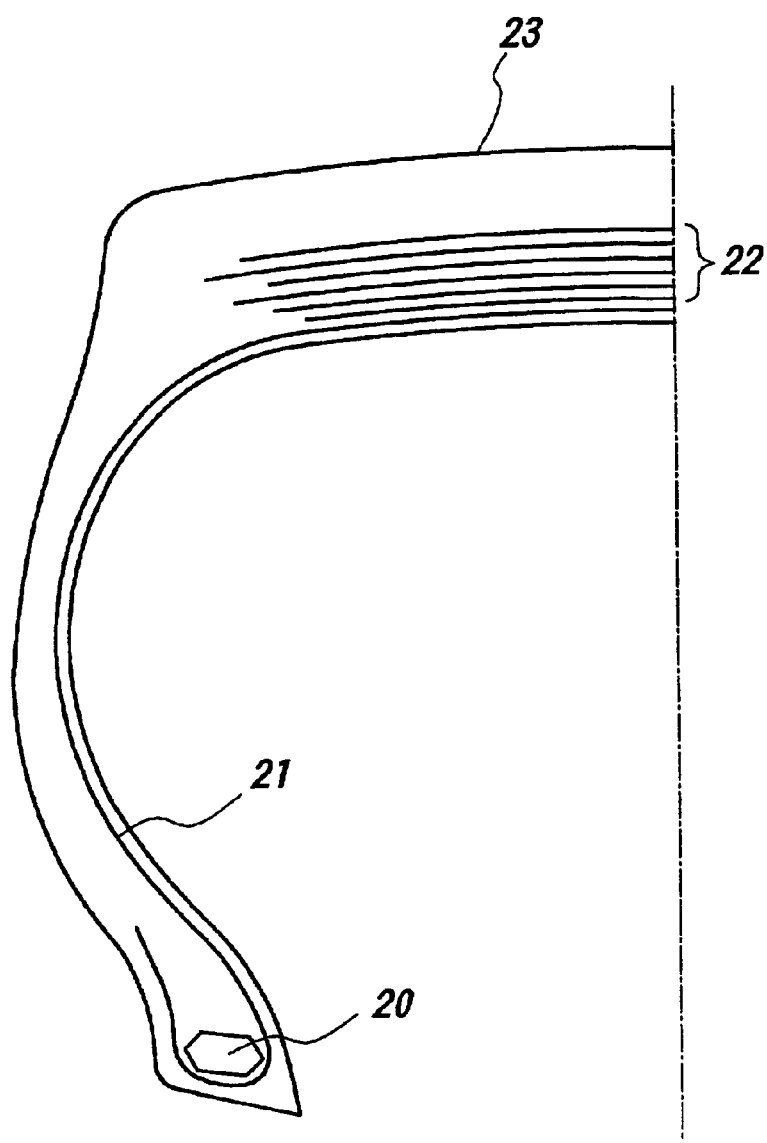
FIG. 10 is a diagrammatically radial half section view of a tire suitable for applying the cords according to the invention.

| | | Conventional Example 23 | Conventional Example 24 | Example 23 | Example 24 |
|---|---|---|---|---|---|
| Construction of cord | | 7 × 27 + 1 (FIG. 1) | 7 × 27 + 1 (FIG. 1) | 27 + 8 × 20 + 1 (FIG. 9) | 7 × 25 + 1 (FIG. 7) |
| Construction of core strand | | 3 + 9 + 15 | 3 + 9 + 15 | 3 + 9 + 15 | 3 + 9 + 13 |
| Construction of sheath strand | | 3 + 9 + 15 | 3 + 9 + 15 | 3 + 9 + 8 | 3 + 9 + 13 |
| Core strand | Filament diameter in core (mm) | 0.30 | 0.30 | 0.41 | 0.28 |
| | Filament diameter in first sheath layer (mm) | 0.30 | 0.30 | 0.41 | 0.28 |
| | Filament diameter in second sheath layer $\phi c$ (mm) | 0.30 | 0.30 | 0.41 | 0.34 |
| | Tensile strength of filament (MPa) | | | | |
| | core | 2850 | 3301 | 3023 | 3374 |
| | first sheath | 2850 | 3301 | 3023 | 3374 |
| | second sheath | 2850 | 3301 | 3023 | 3216 |
| Sheath strand | Filament diameter in core (mm) | 0.30 | 0.30 | 0.17 | 0.28 |
| | Filament diameter in first sheath layer (mm) | 0.30 | 0.30 | 0.17 | 0.28 |
| | Filament diameter in second sheath layer $\phi s$ (mm) | 0.30 | 0.30 | 0.41 | 0.34 |
| | Tensile strength of filament (MPa) | | | | |
| | core | 2850 | 3301 | 3610 | 3374 |
| | first sheath | 2850 | 3301 | 3610 | 3374 |
| | second sheath | 2850 | 3301 | 3023 | 3216 |
| Diameter of sheath strand $\Phi$ (mm) | | 1.847 | 1.847 | 1.526 | 1.844 |
| $\Phi/6.14\ \phi s$ | | 1.00 | 1.00 | 0.61 | 0.88 |
| Diameter of wrapping filament (mm) | | 0.25 | 0.25 | 0.25 | 0.25 |
| Diameter of cord (mm) | | 5.54 | 5.54 | 5.58 | 5.53 |
| Gap between filaments in outer-most layer of core strand (mm) | | 0.022 | 0.022 | 0.029 | 0.020 |
| Gap between filaments in outer-most layer of sheath strand (mm) | | 0.022 | 0.022 | 0.017 | 0.020 |

TABLE 3-continued

|  | Conventional Example 23 | Conventional Example 24 | Example 23 | Example 24 |
|---|---|---|---|---|
| Filament occupying ratio in core strand | 0.713 | 0.713 | 0.713 | 0.719 |
| Filament occupying ratio in sheath strand | 0.713 | 0.713 | 0.726 | 0.719 |
| Ratio of developing tenacity (%) | 91.5 | 82.9 | 89.9 | 90.5 |

INDUSTRIAL APPLICABILITY

According to the invention, the precedent breakage of a part of filaments in the cords of the strand construction is avoided to control the lowering of the cord tenacity, so that there can be provided steel cords having a sufficient durability and tires having an excellent durability by using such cords.

What is claimed is:

1. A steel cord for the reinforcement of a rubber article comprising:
   a core strand formed by twisting a plurality of filaments, and
   a plurality of sheath strands arranged around the core strand and each formed by twisting a plurality of filaments,
   wherein each of the sheath strands is formed by twisting outer and inner sheath layers made of plural filaments around a core made of at least one filament, all of the filaments constituting each sheath layer of each sheath strand have the same diameter, a diameter of the filaments of the outer sheath layer of each sheath strand is larger than a diameter of the filaments of the inner sheath layer located inside the outer sheath layer, and a diameter of the filaments of the inner sheath layer of each sheath strand is larger than a diameter of the at least one filament of the core located inside the inner sheath layer.

2. A steel cord for the reinforcement of a rubber article comprising:
   a core strand formed by twisting a plurality of filaments, and
   a plurality of sheath strands arranged around the core strand and each formed by twisting a plurality of filaments,
   wherein the core strand is formed by twisting outer and inner sheath layers made of plural filaments around a core made of three filaments, all of the filaments constituting each sheath layer of the core strand have the same diameter, and a diameter of every filament constituting the outer sheath layer of the core strand is larger than a diameter of every filament constituting the inner sheath layer located inside the outer sheath layer and a diameter of every filament constituting the core located inside the inner sheath layer.

3. A steel cord for the reinforcement of a rubber article according to claim 2, wherein a ratio of total sectional area of all filaments constituting the core strand to area of a circumcircle formed by filaments constituting the outer sheath layer is not less than 0.730.

4. A steel cord for the reinforcement of a rubber article according to claim 2, wherein a distance between mutual steel filaments in each layer of each strand is not more than 0.014 mm.

5. A steel cord for the reinforcement of a rubber article comprising:
   a core strand formed by twisting a plurality of filaments, and
   a plurality of sheath strands arranged around the core strand and each formed by twisting a plurality of filaments,
   wherein each of the core strand and the sheath strand is formed by twisting outer and inner sheath layers made of plural filaments around a core made of three filaments, all of the filaments constituting each sheath layer of each of the core strand and the sheath strands have the same diameter, and a diameter of every filament constituting the outer sheath layer of each of the core strand and the sheath strands is larger than a diameter of every filament constituting the inner sheath layer located inside the outer sheath layer and a diameter of every filament constituting the core located inside the inner sheath layer.

6. A steel cord for the reinforcement of a rubber article according to claim 5, wherein for each strand, a ratio of total sectional area of all filaments constituting the strand to area of a circumcircle formed by filaments constituting an outermost sheath layer is not less than 0.730.

7. A steel cord for the reinforcement of a rubber article according to claim 5, wherein a distance between mutual steel filaments in each layer of the strand is not more than 0.014 mm.

8. A steel cord for the reinforcement of a rubber article comprising:
   a core strand formed by twisting a plurality of filaments, and
   a plurality of sheath strands arranged around the core strand and each formed by twisting a plurality of filaments,
   characterized in that each of the sheath strands is formed by twisting two sheath layers made of plural filaments around a core made of one or more filaments, and all of the filaments constituting each sheath layer of each sheath strand have the same diameter and a diameter of every filament constituting an outermost sheath layer of each sheath strand is larger than a diameter of every filament constituting every layer located inside the outermost sheath layer, and when a diameter of a filament constituting an outermost sheath layer in the sheath strand is $\phi s$ (mm) and a diameter of a circumcircle inscribing all filaments in the outermost sheath layer is $\Phi$ (mm), they satisfy a relation of $0.55 \leq \Phi/6.14\phi s \leq 0.90$, and when a diameter of a filament constituting an outermost sheath layer in the core strand is $\phi c$ (mm), it satisfies a relation of $\phi s \leq \phi c$.

9. A steel cord for the reinforcement of a rubber article according to claim 8, wherein all filaments other than filaments constituting the outermost sheath layer in the sheath strands has the same diameter.

10. A steel cord for the reinforcement of a rubber article according to claim 8, wherein all filaments other than filaments constituting the core in the sheath strands have the same diameter.

11. A steel cord for the reinforcement of a rubber article according to claim 8, wherein all filaments other than filaments constituting an outermost sheath layer in the core strand have the same diameter.

12. A steel cord for the reinforcement of a rubber article according to claim 8, wherein all diameter other than filaments constituting the core in the core stand have the same diameter.

13. A steel cord for the reinforcement of a rubber article according to claim 8, wherein all filaments constituting the core strand have the same diameter.

14. A steel cord for the reinforcement of a rubber article according to claim 8, wherein filaments constituting the outermost sheath layer in the sheath strand have a diameter of 0.20–0.50 mm.

15. A steel cord for the reinforcement of a rubber article according to claim 8, wherein the filaments have a tensile strength of not less than 3000 MPa.

16. A steel cord for the reinforcement of a rubber article according to claim 8, wherein the cord has a cord construction formed by arranging six sheath strands around one core strand, each of these sheath strands has a construction formed by arranging two sheath layers made of plural filaments around a core made of three filaments.

17. A steel cord for the reinforcement of a rubber article according to claim 8, wherein a twisting direction of the outermost sheath layer in the sheath strand is the same as that of the sheath strand.

18. A steel cord for the reinforcement of a rubber article according to claim 8, wherein the cord has a wrapping filament helically wound along an outer periphery of the cord.

19. A tire comprising a carcass toroidally extending between a pair of bead portions as a skeleton and a belt disposed on an outside of the carcass in a radial direction and comprised of plural belt layers, and steel cords applied to at least one of the carcass and the belt layers,
    wherein the steel cords comprise a core strand and a plurality of sheath strands, each formed by twisting a plurality of filaments, wherein each of the core strand and the sheath strands is formed by twisting outer and inner sheath layers made of plural filaments around a core made of at least one filament, all of the filaments constituting each sheath layer of each of the core strand and the sheath strands have the same diameter, a diameter of every filament of the outer sheath layer of each of the core strand and the sheath strands is larger than a diameter of every filament of the inner sheath layer located inside the outer sheath layer, and a diameter of every filament of the inner sheath layer of each of the core strand and the sheath strands is larger than a diameter of the at least one filament of the core located inside the inner sheath layer.

20. A steel cord for the reinforcement of a rubber article comprising:
    a core strand formed by twisting a plurality of filaments; and
    a plurality of sheath strands arranged around the core strand and each formed by twisting a plurality of filaments;
    wherein the core strand is formed by twisting a sheath layer made of plural filaments around a core made of three filaments, and all of the filaments constituting the sheath layer of the core strand have the same diameter, which is larger than a diameter of the filaments constituting the core strand, and
    wherein a ratio of total sectional area of all filaments constituting the core strand to area of a circumcircle formed by filaments constituting the sheath layer is not less than 0.715.

21. A steel cord for the reinforcement of a rubber article comprising:
    a core strand formed by twisting a plurality of filaments; and
    a plurality of sheath strands arranged around the core strand and each formed by twisting a plurality of filaments,
    wherein the core strand is formed by twisting two sheath layers made of plural filaments around a core made of three filaments, all of the filaments constituting each sheath layer of the core strand have the same diameter, and a diameter of every filament constituting an outermost sheath layer of the core strand is larger than a diameter of every filament constituting the core of the core strand, and
    wherein a ratio of total sectional area of all filaments constituting the core strand to area of a circumcircle formed by filaments constituting the outermost sheath layer is not less than 0.730.

22. A steel cord for the reinforcement of a rubber article comprising:
    a core strand formed by twisting a plurality of filaments; and
    a plurality of sheath strands arranged around the core strand and each formed by twisting a plurality of filaments,
    wherein each of the core strand and the sheath strands is formed by twisting a sheath layer made of plural filaments around a core made of three filaments, all of the filaments constituting the sheath layer of each of the core strand and the sheath strands have a diameter larger than that of the every filament constituting the core of each of the core strand and the sheath strands, and
    wherein for each strand, a ratio of total sectional area of all filaments constituting the strand to area of a circumcircle formed by filaments constituting the sheath layer is not less than 0.715.

23. A steel cord for the reinforcement of a rubber article comprising:
    a core strand formed by twisting a plurality of filaments; and
    a plurality of sheath strands arranged around the core strand and each formed by twisting a plurality of filaments,
    wherein each of the core strand and the sheath strands is formed by twisting two sheath layers made of plural filaments around a core made of three filaments, all of the filaments constituting each sheath layer of each of the core strand and the sheath strands have the same diameter, and a diameter of every filament constituting an outermost sheath layer of each of the core strand and the sheath strands is larger than a diameter of every filament constituting the core of each of the core strand and the sheath strands, and
    wherein for each strand, a ratio of total sectional area of all filaments constituting the strand to area of a circumcircle formed by filaments constituting the outermost sheath layer is not less than 0.730.

24. A steel cord for the reinforcement of a rubber article comprising:
    a core strand formed by twisting a plurality of filaments; and
    a plurality of sheath strands arranged around the core strand and each formed by twisting a plurality of filaments,
    wherein the core strand is formed by twisting one or two sheath layers made of plural filaments around a core made of three filaments, all of the filaments constituting each sheath layer of the core strand have the same diameter, and a diameter of every filament constituting an outermost sheath layer of the core strand is larger than a diameter of every filament constituting the core of the core strand, and wherein a distance between mutual steel filaments in each layer of each strand is not more than 0.014 mm.

25. A steel cord for the reinforcement of a rubber article comprising:

a core strand formed by twisting a plurality of filaments; and a plurality of sheath strands arranged around the core strand and each formed by twisting a plurality of filaments, wherein the sheath strands are formed by twisting two sheath layers each made of plural filaments around a core made of three filaments, all of the filaments constituting an outermost sheath layer of each sheath strand have the same diameter, and when a diameter of a filament constituting an outermost sheath layer in the sheath strands is $\phi s$ (mm) and a diameter of a circum-circle inscribing all filaments in the outermost sheath layer is $\Phi$ (mm), they satisfy a relation of $0.55 \leq \Phi/6.14\phi s \leq 0.90$, and when a diameter of a filament constituting an outermost sheath layer in the core strand is $\phi c$ (mm), it satisfies a relation of $\phi s \leq \phi c$, wherein all filaments other than filaments constituting the outermost sheath layer in the sheath strands has the same diameter.

26. A steel cord for the reinforcement of a rubber article comprising:

a core strand formed by twisting a plurality of filaments; and a plurality of sheath strands arranged around the core strand and each formed by twisting a plurality of filaments, wherein the sheath strands are formed by twisting two sheath layers each made of plural filaments around a core made of three filaments, all of the filaments constituting an outermost sheath layer of each sheath strand have the same diameter, and when a diameter of a filament constituting an outermost sheath layer in the sheath strands is $\phi s$ (mm) and a diameter of a circum-circle inscribing all filaments in the outermost sheath layer is $\Phi$ (mm), they satisfy a relation of $0.55 \leq \Phi/6.14\phi s \leq 0.90$, and when a diameter of a filament constituting an outermost sheath layer in the core strand is $\phi c$ (mm), it satisfies a relation of $\phi s \leq \phi c$, wherein all filaments other than filaments constituting the core in the sheath strands have the same diameter.

27. A steel cord for the reinforcement of a rubber article comprising:

a core strand formed by twisting a plurality of filaments; and a plurality of sheath strands arranged around the core strand and each formed by twisting a plurality of filaments, wherein the sheath strands are formed by twisting two sheath layers each made of plural filaments around a core made of three filaments, all of the filaments constituting an outermost sheath layer of each sheath strand have the same diameter, and when a diameter of a filament constituting an outermost sheath layer in the sheath strands is $\phi s$ (mm) and a diameter of a circum-circle inscribing all filaments in the outermost sheath layer is $\Phi$ (mm), they satisfy a relation of $0.55 \leq \Phi/6.14\phi s \leq 0.90$, and when a diameter of a filament constituting an outermost sheath layer in the core strand is $\phi c$ (mm), it satisfies a relation of $\phi s \leq \phi c$, wherein all filaments other than filaments constituting an outermost sheath layer in the core strand have the same diameter.

28. A steel cord for the reinforcement of a rubber article comprising:

a core strand formed by twisting a plurality of filaments; and a plurality of sheath strands arranged around the core strand and each formed by twisting a plurality of filaments, wherein the sheath strands are formed by twisting two sheath layers each made of plural filaments around a core made of three filaments, all of the filaments constituting an outermost sheath layer of each sheath strand have the same diameter, and when a diameter of a filament constituting an outermost sheath layer in the sheath strands is $\phi s$ (mm) and a diameter of a circum-circle inscribing all filaments in the outermost sheath layer is $\Phi$ (mm), they satisfy a relation of $0.55 \leq \Phi/6.14\phi s \leq 0.90$, and when a diameter of a filament constituting an outermost sheath layer in the core strand is $\phi c$ (mm), it satisfies a relation of $\phi s \leq \phi c$, wherein all diameter other than filaments constituting the core in the core stand have the same diameter.

29. A steel cord for the reinforcement of a rubber article comprising:

a core strand formed by twisting a plurality of filaments; and a plurality of sheath strands arranged around the core strand and each formed by twisting a plurality of filaments, wherein the sheath strands are formed by twisting two sheath layers each made of plural filaments around a core made of three filaments, all of the filaments constituting an outermost sheath layer of each sheath strand have the same diameter, and when a diameter of a filament constituting an outermost sheath layer in the sheath strands is $\phi s$ (mm) and a diameter of a circum-circle inscribing all filaments in the outermost sheath layer is $\Phi$ (mm), they satisfy a relation of $0.55 \leq \Phi/6.14\phi s \leq 0.90$, and when a diameter of a filament constituting an outermost sheath layer in the core strand is $\phi c$ (mm), it satisfies a relation of $\phi s \leq \phi c$, wherein all filaments constituting the core strand have the same diameter.

30. A steel cord for the reinforcement of a rubber article comprising:

a core strand formed by twisting a plurality of filaments; and a plurality of sheath strands arranged around the core strand and each formed by twisting a plurality of filaments, wherein each of the core strand and the sheath strands is formed by twisting one or two sheath layers made of plural filaments around a core made of three filaments, all of the filaments constituting each sheath layer of each of the core strand and the sheath strands have the same diameter, and a diameter of every filament constituting an outermost sheath layer of each of the core strand and the sheaths strands is larger than a diameter of every filament constituting the core of each of the core strand and the sheath strands, and wherein a distance between mutual steel filaments in each layer of the strand is not more than 0.014 mm.

* * * * *